United States Patent
Mayer et al.

(10) Patent No.: US 10,462,210 B2
(45) Date of Patent: Oct. 29, 2019

(54) TECHNIQUES FOR AUTOMATED INSTALLATION, PACKING, AND CONFIGURATION OF CLOUD STORAGE SERVICES

(71) Applicant: Oracle International Corporation, Redwood Shores, CA (US)

(72) Inventors: Stephen Mayer, Redwood Shores, CA (US); Naresh Revanuru, Redwood Shores, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 14/622,638

(22) Filed: Feb. 13, 2015

(65) Prior Publication Data
US 2015/0229521 A1    Aug. 13, 2015

Related U.S. Application Data

(60) Provisional application No. 61/939,657, filed on Feb. 13, 2014.

(51) Int. Cl.
| | |
|---|---|
| G06F 9/46 | (2006.01) |
| H04L 29/08 | (2006.01) |
| G06F 9/50 | (2006.01) |
| G06F 21/33 | (2013.01) |
| H04L 12/24 | (2006.01) |

(52) U.S. Cl.
CPC ............ *H04L 67/10* (2013.01); *G06F 9/5072* (2013.01); *G06F 21/335* (2013.01); *H04L 41/0806* (2013.01); *H04L 67/1097* (2013.01)

(58) Field of Classification Search
None
See application file for complete search history.

(56) References Cited

U.S. PATENT DOCUMENTS

| | | |
|---|---|---|
| 7,010,600 B1 | 3/2006 | Prasad et al. |
| 7,434,252 B2 | 10/2008 | Ballinger et al. |
| 7,577,729 B1 * | 8/2009 | Umbehocker ........ G06F 3/0607 709/213 |
| 8,302,201 B1 | 10/2012 | Gupta et al. |

(Continued)

OTHER PUBLICATIONS

U.S. Appl. No. 14/622,648, Non-Final Office Action dated Sep. 13, 2016, 17 pages.

(Continued)

*Primary Examiner* — Hamza N Algibhah
*Assistant Examiner* — Tony Williams
(74) *Attorney, Agent, or Firm* — Kilpatrick Townsend & Stockton LLP

(57) ABSTRACT

In some embodiments, a method of automatically configuring nodes in a storage service can include receiving, from an administrative computer, a configuration script at an installation framework executing in a cloud-based storage service. The configuration script can define a plurality of nodes to be deployed in the cloud-based storage service. The method can further include parsing the configuration script to identify configuration data for the plurality of nodes, and automatically installing each node in the plurality of nodes based on the configuration data, and, in response to a deployment instruction, deploying the plurality of nodes in the cloud-based storage service.

19 Claims, 7 Drawing Sheets

(56) References Cited

U.S. PATENT DOCUMENTS

| | | | |
|---|---|---|---|
| 8,352,608 B1* | 1/2013 | Keagy | G06F 8/63 |
| | | | 709/220 |
| 8,402,514 B1 | 3/2013 | Thompson et al. | |
| 8,745,718 B1 | 6/2014 | Dufel et al. | |
| 8,775,810 B1 | 7/2014 | Snodgrass et al. | |
| 9,027,091 B2 | 5/2015 | Mardikar et al. | |
| 9,154,568 B2 | 10/2015 | Alison et al. | |
| 9,407,615 B2 | 8/2016 | Shah et al. | |
| 9,721,117 B2 | 8/2017 | Pleau et al. | |
| 10,083,317 B2 | 9/2018 | Pleau et al. | |
| 2002/0095571 A1 | 7/2002 | Bradee et al. | |
| 2002/0095581 A1 | 7/2002 | Imai et al. | |
| 2003/0005308 A1 | 1/2003 | Rathbun et al. | |
| 2005/0013310 A1* | 1/2005 | Banker | H04L 25/4908 |
| | | | 370/401 |
| 2005/0138362 A1 | 6/2005 | Kelly et al. | |
| 2006/0015933 A1 | 1/2006 | Ballinger et al. | |
| 2006/0037016 A1* | 2/2006 | Saha | G06F 8/61 |
| | | | 717/178 |
| 2006/0224687 A1* | 10/2006 | Popkin | G06F 17/30132 |
| | | | 709/217 |
| 2007/0150934 A1 | 6/2007 | Fiszman et al. | |
| 2007/0245414 A1 | 10/2007 | Chan et al. | |
| 2008/0287136 A1* | 11/2008 | Ludwig | H04W 88/08 |
| | | | 455/446 |
| 2009/0094684 A1 | 4/2009 | Chinnusamy et al. | |
| 2009/0276824 A1 | 11/2009 | Rafiq et al. | |
| 2009/0313684 A1 | 12/2009 | Shah et al. | |
| 2011/0022812 A1* | 1/2011 | van der Linden | G06F 9/5077 |
| | | | 711/163 |
| 2011/0238737 A1 | 9/2011 | Agrawal et al. | |
| 2012/0084869 A1 | 4/2012 | Bilaney et al. | |
| 2012/0096526 A1 | 4/2012 | Brahmanapalli et al. | |
| 2012/0117586 A1 | 5/2012 | Mccoy et al. | |
| 2012/0233668 A1* | 9/2012 | Leafe | G06F 9/5022 |
| | | | 726/4 |
| 2012/0246695 A1 | 9/2012 | Cameron et al. | |
| 2012/0266156 A1* | 10/2012 | Spivak | G06F 9/5055 |
| | | | 717/172 |
| 2012/0311111 A1* | 12/2012 | Frew | G06F 9/5072 |
| | | | 709/221 |
| 2012/0330898 A1* | 12/2012 | Bk | G06F 11/2089 |
| | | | 707/659 |
| 2013/0007891 A1 | 1/2013 | Mogaki | |
| 2013/0232498 A1* | 9/2013 | Mangtani | G06F 9/5072 |
| | | | 718/104 |
| 2013/0283350 A1 | 10/2013 | Afek et al. | |
| 2013/0318242 A1 | 11/2013 | Srinivasa | |
| 2014/0047434 A1 | 2/2014 | Lam et al. | |
| 2014/0215595 A1 | 7/2014 | Prasad et al. | |
| 2014/0280805 A1 | 9/2014 | Sawalha | |
| 2014/0298323 A1 | 10/2014 | Stolberg et al. | |
| 2014/0337493 A1 | 11/2014 | Tung | |
| 2014/0373126 A1 | 12/2014 | Hussain et al. | |
| 2015/0180868 A1 | 6/2015 | Sng | |
| 2015/0227749 A1 | 8/2015 | Schincariol et al. | |
| 2016/0087960 A1 | 3/2016 | Pleau et al. | |
| 2017/0323117 A1 | 11/2017 | Pleau et al. | |
| 2019/0026486 A1 | 1/2019 | Pleau et al. | |

OTHER PUBLICATIONS

U.S. Appl. No. 14/853,747, "Non-Final Office Action", dated Dec. 16, 2016, 6 pages.

U.S. Appl. No. 14/622,648, "Final Office Action", dated Apr. 20, 2017, 27 pages.

U.S. Appl. No. 14/853,747, "Notice of Allowance", dated Mar. 28, 2017, 9 pages.

U.S. Appl. No. 14/622,648, Non-Final Office Action, dated Nov. 2, 2017, 36 pages.

U.S. Appl. No. 15/661,641, Non-Final Office Action, dated Dec. 28, 2017, 13 pages.

U.S. Appl. No. 14/622,648, Notice of Allowance dated Oct. 19, 2018, 32 pages.

U.S. Appl. No. 16/140,299, Non-Final Office Action dated Nov. 27, 2018, 7 pages.

U.S. Appl. No. 14/622,648, Final Office Action dated Jun. 14, 2018, 41 pages.

U.S. Appl. No. 15/661,641, Notice of Allowance dated May 9, 2018, 8 pages.

* cited by examiner

TECHNIQUES FOR AUTOMATED INSTALLATION, PACKING, AND CONFIGURATION OF CLOUD STORAGE SERVICES

CROSS-REFERENCE TO RELATED APPLICATION

The present application is a non-provisional application of and claims the benefit and priority under 35 U.S.C. 119(e) of U.S. Provisional Application No. 61/939,657, filed Feb. 13, 2014, entitled "CLOUD STORAGE SERVICES," the entire contents of which is incorporated herein by reference for all purposes.

BACKGROUND OF THE INVENTION

The present disclosure relates generally to computer systems and software, and more particularly to techniques for providing cloud storage services in an enterprise environment.

Data storage, both from an enterprise and from a consumer perspective, has progressed from locally stored storage systems for each computer system, to network attached storage which serves as centralized storage for a number of networked computer systems. These systems are typically owned and maintained by the end user, resulting in significant costs and complexity for end users to manage. In response, cloud-based storage services have been created which provide secure, elastic, reliable, and cost-effective storage solutions. With cloud-based storage services, the end user need only enroll in the service and the service provider manages the hardware and configuration, data security and integrity, etc. This enables users to change the amount of storage available cheaply and easily, by signing up for a different level of service. Once enrolled, authorized users and/or applications can access the data from any Internet-connected device.

Because the costs, maintenance, and configuration and data storage in a cloud-based storage service is offloaded to the service provider, the service provider needs to be able to quickly and dynamically add, remove, or repurpose computing resources available to them. Traditionally, this has led to significant costs at the data center level to staff, monitor, and reconfigure computing resources to accommodate demand.

BRIEF SUMMARY OF THE INVENTION

In certain embodiments, techniques are provided (e.g., a method, a system, non-transitory computer-readable medium storing code or instructions executable by one or more processors) to implement a configuration and installation framework that includes one or more files (e.g., Java archive files, RPM files, or other files) that are used to install object storage system software on a physical or virtual machine. The configuration and installation framework can use a configuration script to automatically install and configure each node in the object storage system software and configures the object storage system (time to live, environmental variables, etc.).

In some embodiments, a method of automatically configuring nodes in a storage service can include receiving, from an administrative computer, a configuration script at an installation framework executing in a cloud-based storage service. The configuration script can define a plurality of nodes to be deployed in the cloud-based storage service. The method can further include parsing the configuration script to identify configuration data for the plurality of nodes, and automatically installing each node in the plurality of nodes based on the configuration data, and, in response to a deployment instruction, deploying the plurality of nodes in the cloud-based storage service.

In some embodiments, a method of automatically reconfiguring nodes in a storage service can include receiving a request, which includes an update configuration script, to reconfigure the plurality of nodes in the cloud-based storage service. The update configuration script can be parsed to identify updated configuration data for the plurality of nodes. The cloud-based storage service may be queried to determine current configuration data for the cloud-based storage service. The updated configuration data to the current configuration data, and the cloud-based storage service can be automatically updated based on a difference between the updated configuration data to the current configuration data.

In some embodiments, automatically updating further comprises storing the updated configuration data in an administrative node in the plurality of nodes. In some embodiments, the administrative node in the plurality of nodes automatically updates a plurality of proxy nodes associated with the administrative node. In some embodiments, the configuration data defines, for each node, a type of node, an address of the node, and disk space associated with the node.

The techniques described above and below may be implemented in a number of ways and in a number of contexts. Several example implementations and contexts are provided with reference to the following figures, as described below in more detail. However, the following implementations and contexts are but a few of many.

DETAILED DESCRIPTION OF THE INVENTION

In the following description, for the purposes of explanation, specific details are set forth in order to provide a thorough understanding of embodiments of the invention. However, it will be apparent that various embodiments may be practiced without these specific details. The figures and description are not intended to be restrictive.

In some embodiments, a configuration and installation framework can be provided that includes one or more files (e.g., Java archive files, RPM files, or other files) that are used to install object storage system software on a physical or virtual machine. The configuration and installation framework can include a script that automatically extracts each of the one or more files and installs the object storage system software and configures the object storage system (time to live, environmental variables, etc.).

In some embodiments, the installation and configuration framework receives a configuration file (e.g., in Javascript Object Notation (JSON) or any other suitable format) which defines a storage cluster which includes a plurality of nodes. For each node in the storage cluster, the configuration file can specify: a type of node; an address; number of disks and/or disk space; and other configuration information. The configuration file can be received by the framework from an administrator. In some embodiments, the administrator can use an administrative console connected to the storage cluster to provide the configuration file to the storage cluster.

The configuration file can be received as input to an installer, which extracts cluster configuration information from the configuration file and automatically configures each node using the configuration information. In some embodiments, the installer can be used to configure multiple nodes on the same hardware or virtual machine and/or can be used to configure multiple nodes across one or more hardware or virtual machines. The configuration file can define multiple types of nodes in a cluster. For example, types of nodes can include storage nodes (e.g., nodes that include computer readable storage media for storing data), proxy nodes (e.g., nodes that handle requests for data stored on storage nodes), and master/admin proxy nodes (e.g., nodes that manage cluster configuration and account configuration data).

Using the configuration file, a new storage cluster can be set up, or an existing storage cluster can be updated or expanded, automatically. This saves significant time, cost, and risk of error associated with manually setting up each node in the cluster. This and other embodiments are described in greater detail below.

Figure 1:
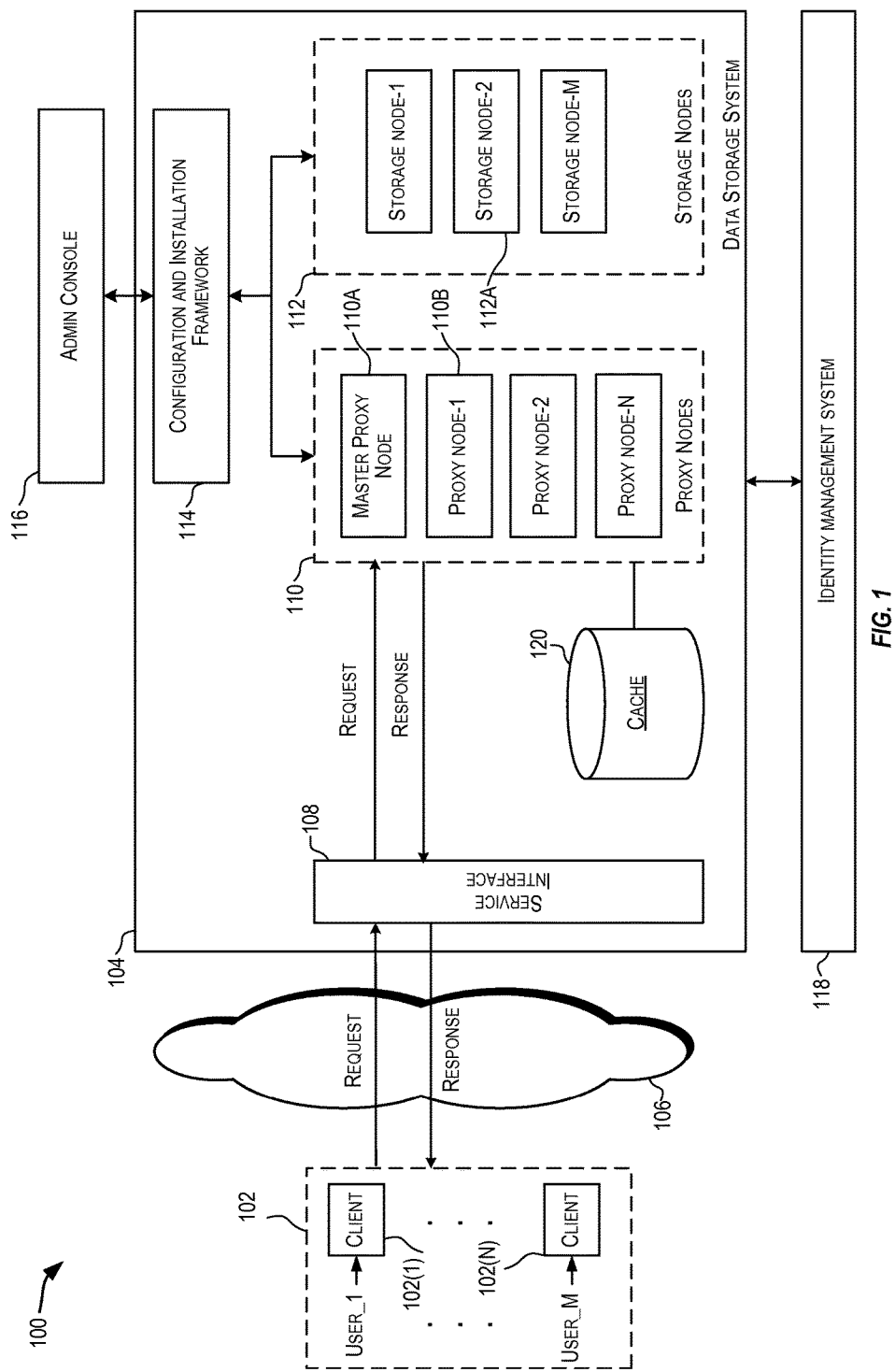
FIG. 1 depicts a simplified high level diagram of a network environment that may incorporate an embodiment of the present invention.

FIG. 1 depicts a simplified high level diagram of a network environment 100 that may incorporate an embodiment of the present invention. As shown, network environment 100 may include one or more client devices 102(1)-102(N) (collectively, client devices 102) communicatively coupled to a data storage system 104 via a communication network 106. The embodiment depicted in FIG. 1 is merely an example and is not intended to unduly limit the claimed embodiments of the present invention. One of ordinary skill in the art would recognize many variations, alternatives, and modifications. For example, there may be more or fewer client devices than those shown in FIG. 1.

The client devices may be of various different types, including, but not limited to personal computers, desktops, mobile or handheld devices such as a laptop, a mobile phone, a tablet, etc., and other types of devices. Communication network 106 facilitates communications between client devices 102 and data storage system 104. Communication network 106 can be of various types and can include one or more communication networks. Examples of communication network 106 include, without restriction, the Internet, a wide area network (WAN), a local area network (LAN), an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, AppleTalk, Bluetooth, and other protocols. In general, communication network 106 may include any communication network or infrastructure that facilitates communications between clients and data storage system 104.

In some embodiments, data storage system 104 may include a service interface 108 that may be configured to receive and manage requests from client devices 102. Service interface 108 can be a web interface, load balancer, or may implement one or more Representational State Transfer (REST) interfaces or any other interface, that mediates requests and responses between client devices 102 and data storage system 104. For instance, service interface 108 may be configured to receive Hyper Text Transfer Protocol (HTTP) requests formatted as REST requests from client devices 102 via a REST Application Programming Interface (API).

In some embodiments, data storage system 104 may be configured to manage, represent and store data related to an organization. In an embodiment, data storage system 102 may include one or more proxy nodes 110 and one or more storage nodes 112. In some examples, proxy nodes 112 may be implemented as proxy servers configured to receive requests from client devices 102 via service interface 108. In some embodiments, proxy nodes 110 can include a master (or admin) proxy node 110A and one or more proxy nodes 1-N 110B. Master proxy node 110A can be accessible internally through an administrative console 116. When a storage service is set up, a mapping (e.g., a hashmap) is generated which indicates where files are stored in the storage system, based on cluster topology. In some embodiments, the mapping can be generated by the master proxy node 110A and propagated to each proxy node 110B in the cluster. Subsequently, if the cluster is modified (e.g., storage nodes are added or removed), the mapping can be updated and automatically propagated throughout the cluster.

In some embodiments, proxy nodes 110B may be configured to receive requests for data to be stored in data storage system 102 via service interface 108 from client devices 102. In certain embodiments, proxy nodes 110 may be associated with one or more storage node clusters 112. In an embodiment, storage node cluster 112 may include one or more storage nodes. For instance, and as shown in FIG. 1, storage node cluster 112 may include a plurality of storage nodes 1-M 112A. In some embodiments, in response to receiving a request from client devices 102, data storage system 102 may initiate, in parallel, the storage of the data on one or more storage node clusters 112. Data storage system 104 may then be configured to store the data on the storage node clusters (114, 116) and respond to client devices 102 that the data has been stored.

In certain embodiments, proxy nodes 110 may be configured to receive requests from client devices 102 to access information and/or data or objects stored in data storage system 104. This information may include for example, networked files (such as text files, images, videos or the like), directory information, databases, or the like. Data storage system 104 may then be configured to provide the data to the client devices in response to the request.

The various proxy nodes, storage node clusters and storage nodes of data storage system 104 depicted in FIG. 1 are meant for illustrative purposes only and are not intended to limit the scope of embodiments of the present invention. Alternative embodiments may include more or fewer proxy nodes, storage node clusters and storage nodes than those shown in FIG. 1.

In certain embodiments, the storage nodes 112 may be implemented as separate physical nodes. In other embodiments, the storage nodes may each be virtual nodes executing on a single physical node (e.g., the storage nodes may be software nodes implemented on one or more virtual machines executing on a single hardware computing device). In an embodiment, the storage nodes may be configured to store the information that incoming requests from users of client devices 102 wish to access.

In some embodiments, data storage system 104 can include a configuration and installation framework 114. During set up, a user, such as an administrator, can interface with configuration and installation framework 114 through administrative console 116. The configuration and installation framework 114 can automatically set up, or update, the nodes in data storage system 104 using configuration information in a configuration file (e.g., a configuration script). As described above, a configuration file can be received as input to configuration and installation framework 114 from administrative console 116. The configuration file can define multiple types of nodes in a cluster. For example, types of nodes can include storage nodes (e.g., nodes that include computer readable storage media for storing data), proxy nodes (e.g., nodes that handle requests for data stored on storage nodes), and master/admin proxy nodes (e.g., nodes that manage cluster configuration and account configuration data).

Additionally, in some embodiments, configuration and installation framework 114 can implement an update mode. In the update mode, the number of nodes (and associated number of disks or other computer readable storage media) can be added or removed from the cluster. As described further below, an update configuration file which defines nodes in the updated cluster can be received. The updated configuration information in the updated configuration file can be compared to the current configuration information associated with the cluster to identify changes to the cluster. The current configuration information of the cluster can be identified by querying nodes in the data storage system 104. Once updated, master proxy node 110A can be updated (e.g., the mapping maintained by master proxy node 110A) and master proxy node 110A can propagate the updates to other nodes in data storage system 104.

In some embodiments, proxy nodes 110 may be configured to determine if a request from client devices 102 is authorized using an access management system. In some embodiments, access can be controlled by interfacing data storage system 104 with an identity management (IDM) system 118. Access information (e.g., user roles and/or access policies) may be stored in a cache 120 and used by proxy nodes 110 to determine whether a client is authorized to access data associated with a particular data request.

Figure 2:
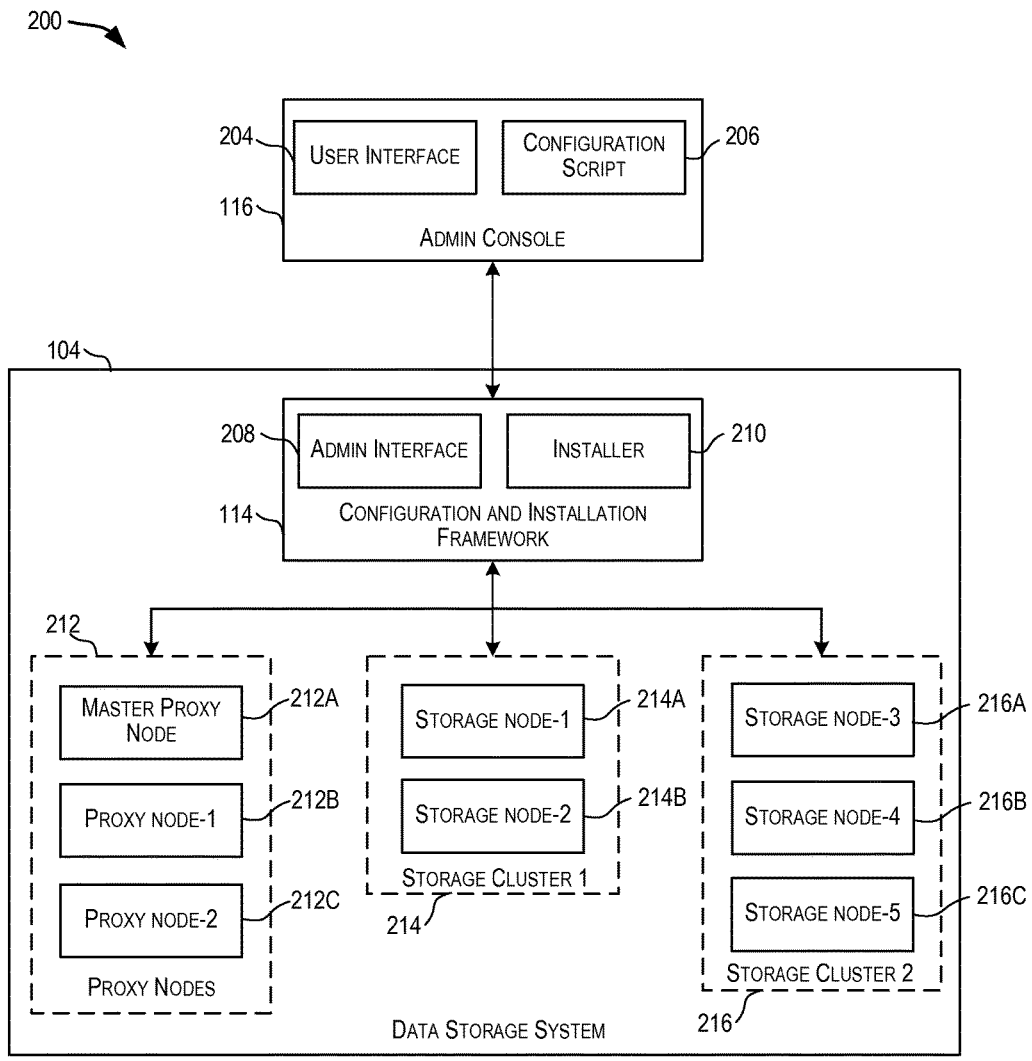
FIG. 2 depicts a simplified high-level diagram of an environment illustrating configuration of a data storage system according to another embodiment of the present invention.

FIG. 2 depicts a simplified high-level diagram of an environment 200 comprising a data storage system according to another embodiment of the present invention. The data storage system may be the same or similar to data storage system 104 described in FIG. 1. In the embodiment depicted in FIG. 2, data storage system 104 may include a proxy server component 212 that comprises one or more proxy nodes and a storage server component 214 that comprises one or more storage nodes. As noted above, the proxy nodes and storage nodes may be implemented as general purpose computers, specialized server computers, server farms, server clusters, or any other appropriate arrangement and/or combination. The various components of data storage system depicted in FIG. 2 are meant for illustrative purposes only and are not intended to limit the scope of embodiments of the present invention. Alternative embodiments may include more or fewer components than those shown in FIG. 2.

In accordance with at least some embodiments, admin console 116 can include a user interface 204 and a configuration script 206. Admin console can be a computer, laptop, tablet, or any other computing system that is operable to interface with data storage system 104. In some embodiments, user interface 204 can include a graphical user interface and/or a text based interface. An administrator can identify a location of configuration script 206 on admin console 116 through user interface 204. The configuration script 206 can include configuration details for each node in data storage system 104. For example, the configuration details can include port and address information, partition information, software version and/or package information, node type, and other configuration information.

In certain embodiments, admin console 116 can communicate with configuration and installation framework 114 through admin interface 208, such as a web interface, admin API, or other interface. Admin console 116 can communicate with admin interface 208 over a direct connection, local area network, wireless LAN, or other connection. In some embodiments, a single admin console 116 can communicate with a plurality of configuration and installation frameworks on a plurality of different hardware and/or virtual machines in a data storage system. For example, in some embodiments, each hardware machine can include an instance of configuration and installation framework 114. In such embodiments, admin console 116 can communicate with the configuration and installation framework 114 to configure one or more nodes to be implemented on that hardware machine. In some embodiments, configuration and installation framework 114 can communicate with a plurality of different hardware machines in data storage system 104 to configure nodes on each hardware machine. For example, proxy nodes 212, storage cluster 1 214, and storage cluster 2 can each execute on separate hardware machines.

In some embodiments, during set up, an admin user can install each type of node sequentially. For example, the admin user can first install and configure master proxy node 212A, followed by each remaining proxy node 212, and complete installation with storage nodes 214, 216. Installation and configuration of each proxy node 212B, 212C can be performed in parallel during installation of the remaining proxy nodes 212. Similarly, storage nodes 214A, 214B, 216A, 216B, 216C can be installed and configured in parallel during installation of the storage nodes.

As described above, during set up an admin user can install and configure a master proxy node 212A. A token key can be generated during installation of master proxy node 212A. The token key can then be used during installation and configuration of the remaining proxy nodes. The admin user can send an installation request to installer 210 through admin interface 208 and provide the configuration script. Installer 210 can authenticate the admin user (e.g., request and/or authenticate credentials from the admin user). In some embodiments, installer 210 can validate the request and/or configuration script 208. Installer 210 can identify installation files associated with the data storage system software version indicated in configuration script 208 and automatically install the data storage system software. Installer 210 can extract configuration data from the configuration script and automatically configure the master proxy node 212A using the configuration data. For example, master proxy node 212A can be configured using the address and port information included in the configuration data.

The master proxy node 212A can synchronize configuration data with the remaining proxy and storage nodes. As described further below, during an update in which new nodes are added to the cluster, the configuration data can be updated at the master proxy node 212A prior to installation of the new nodes. The configuration data can then be propagated to the new nodes during installation. The file will need to be modified before attempting installations on those nodes.

In some embodiments, the installer 210 can extract configuration data from the configuration script 206 (e.g., values for a partition count, replica count, sync time, etc.). If no the extracted configuration data is missing values, installer 210 can automatically use default configuration values in place of missing values. Additionally, installer 210 can verify that the extracted configuration data falls within predefined ranges. For example, installer 210 can verify that the partition count is between 16 and 20, the replica count is between 3 and 10, and the sync time is between 1 and 24. Specific range values provided herein are examples for the purposes of explanation only and are not intended to be limiting. In some embodiments, range values can vary from cluster to cluster based on, e.g., quality of service guarantees, hardware specifications, or other factors.

Based on the configuration of the cluster, a mapping file can be generated by the master proxy node. The mapping file can map objects stored in data storage system 104 to their physical location on disk in a storage node 214, 216. The mapping file can be propagated from the master proxy node 212A to each other node in the cluster. When a request is received for a particular object, the request is managed by a proxy node 212. The proxy node can identify the storage node on which the requested object is stored using the mapping file, retrieve the requested object from the storage node, and return the requested object in response to the request.

In some embodiments, any remaining proxy nodes (e.g., proxy nodes 212B, 212C) can be automatically installed and configured based on the configuration script. The admin user can log in to one or more hardware or virtual machines that host the proxy nodes using admin console 116. The configuration script can then be sent using admin interface 208 to installer 210 on an instance of configuration and installation framework 114. In some embodiments, the admin user can provide a credential (e.g., user name and password) to log into the hardware and/or virtual machine. Installer 210 can check the current configuration of the hardware and/or virtual machine before beginning installation. For example, installer 210 can verify current operating system, memory, disk space, and other requirements, along with confirming that install files (e.g., archives, RPM files, etc.) are available. Once the admin, system, and install files are verified, the installation can begin. Installer 210 can extract configuration data from the configuration script 206, such as address and port information, token key (generated during installation of the master proxy node), storage locations, and other configuration data. The installer can then install each node identified in the configuration script based on the configuration data. A copy of the configuration data can be stored locally along with a copy of the mapping files generated during installation of the master proxy node, as described above.

In certain embodiments, storage nodes 214, 216 may be configured following the installation and configuration of the proxy nodes 212. As before, the admin user can log in to one or more hardware or virtual machines that host the storage nodes using admin console 116. The configuration script can then be sent using admin interface 208 to installer 210 on an instance of configuration and installation framework 114. In some embodiments, the admin user can provide a credential (e.g., user name and password) to log into the hardware and/or virtual machine. Installer 210 can check the current configuration of the hardware and/or virtual machine before beginning installation. For example, installer 210 can verify current operating system, memory, disk space, and other requirements, along with confirming that install files (e.g., archives, RPM files, etc.) are available. Once the admin, system, and install files are verified, the installation can begin. Storage node software can be identified from the install files and installed for each node.

In some embodiments, installer 210 can identify each disk defined in the configuration script and execute one or more disk checks. For example, each disk can be checked for partitions, if the disk is not partitioned then the disk is partitioned and formatted for use. If the disk is partitioned, the partition can be checked to determine whether it is properly formatted. If the disk is not properly formatted and error can be displayed and the user can be prompted to reformat the disk. In some embodiments, once each disk identified in the configuration script has been checked to be mounted, partitioned, and formatted, the configuration data can be stored to each disk along with the mapping file. Once each storage node is installed and the associated disks verified, an instruction to initialize the proxy and storage nodes can be received from the admin console. The data storage system may then be deployed and made ready for use.

In some embodiments, configuration and installation framework can be used to update an existing data storage system (e.g., adding or removing nodes to/from the data storage system). In some embodiments, the data storage system may be updated by "pod". For example, a pod may represent a minimum number of nodes that are added at a given time (such as a minimum of two proxy nodes and five storage nodes). Because the master proxy node and other nodes in the data storage system are already deployed, the update procedure may vary from the install procedure described above.

In some embodiments, where a single master proxy node is used in the data storage system, an add operation can be executed on the master proxy node. As in the install procedure, a configuration script can be received that defines all of the nodes in the cluster. As such, the configuration script identifies both existing nodes and nodes that are being newly added. Configuration information associated with the newly added nodes can be extracted and the mapping file at the master proxy can be updated (e.g., with address, port, and other connection information for the new nodes). In some embodiments, data may also be rebalanced across the storage nodes in view of the new cluster topology. The new configuration information can be stored in the master proxy node and propagated to each node in the cluster, replacing previous configuration information in preexisting nodes. The new nodes that are being added can be installed similarly to a new installation, with a complete configuration file (defining all nodes in the cluster) stored to each.

In some embodiments, installer 210 can determine new nodes from preexisting nodes by querying the cluster to determine current configuration information. For example, if a node is defined in the update configuration file (e.g., by type, address, port, etc.) but no node currently exists matching that configuration, then installer 210 can determine that it is a new node being deployed as part of the update.

Figure 3:
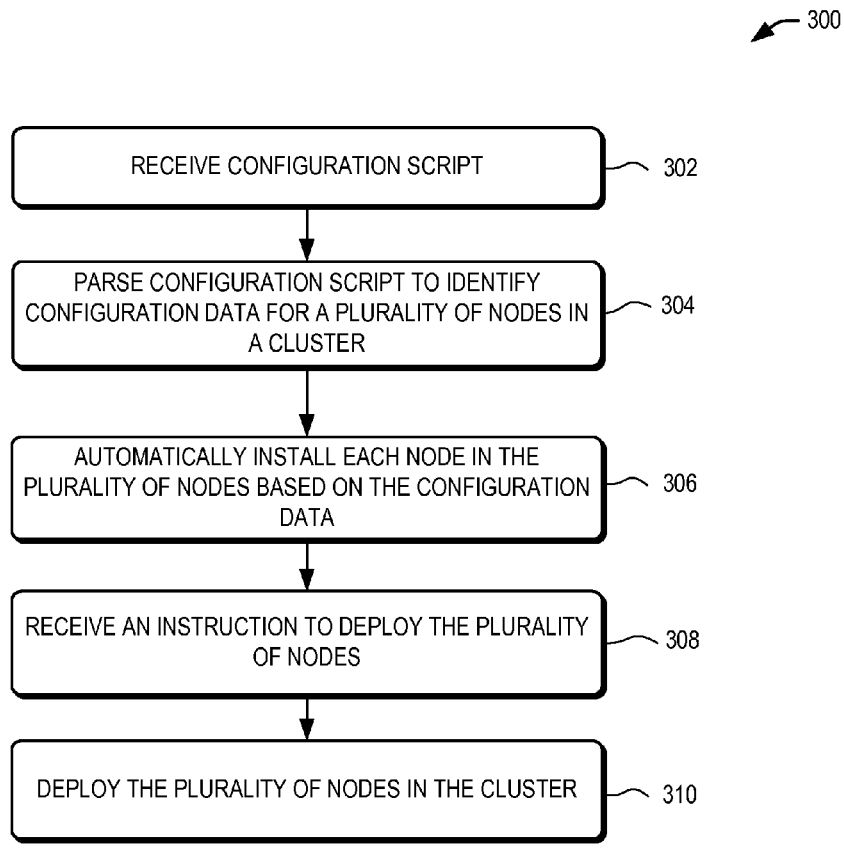
FIG. 3 illustrates an example flow diagram showing a process for automatically configuring nodes in a data storage system, in accordance with one embodiment of the present invention.
Figure 4:
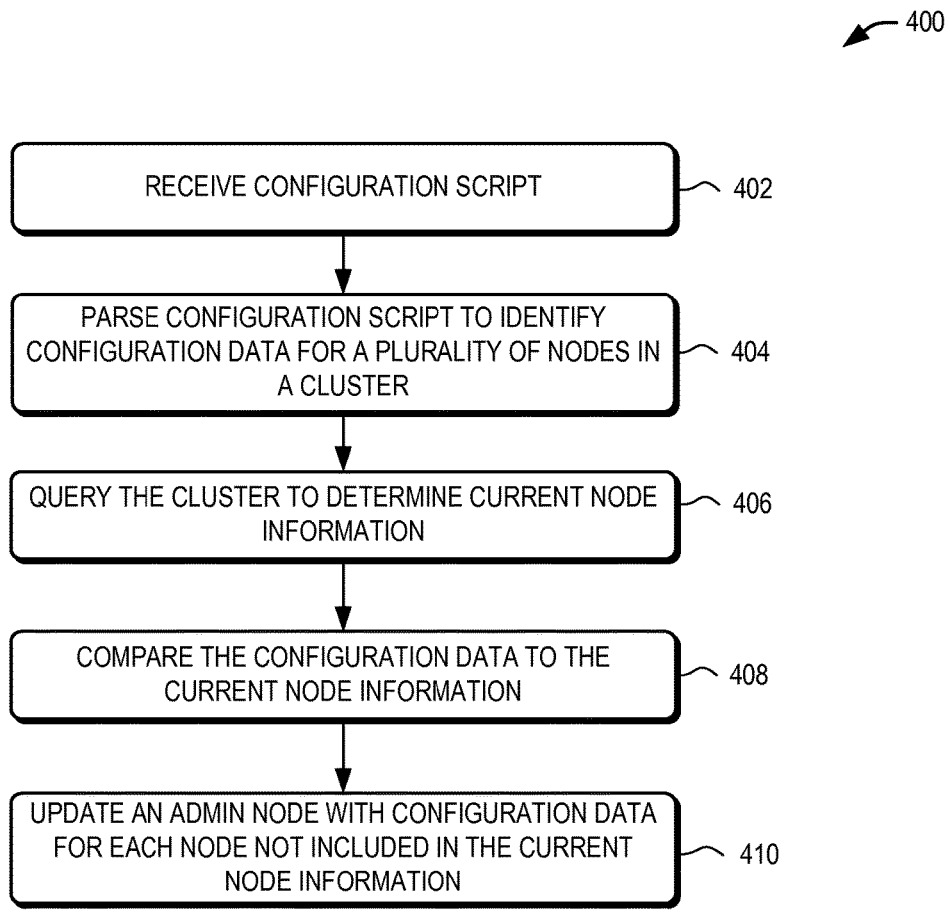
FIG. 4 illustrates an example flow diagram showing a process for automatically updating nodes in a data storage system, in accordance with one embodiment of the present invention.

FIGS. 3 and 4 illustrate example flow diagrams showing processes 300 and 400 for managing the set up and updating of nodes in a data storage system. The processes are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

FIG. 3 illustrates an example flow diagram showing a process 300 for automatically configuring nodes in a data storage system, in accordance with one embodiment of the present invention. In some aspects, the process 300 of FIG. 3 may be performed by one or more proxy nodes of data storage system 104 shown in FIG. 1 and FIG. 2 respectively. The process 300 may begin at 302 by receiving from an administrative computer, a configuration script at an installation framework executing in a cloud-based storage service (e.g., a storage service provided by data storage system 104). As noted above, an administrator can connect to data storage system 104 through admin console 116 to provide configuration script 206 which defines the nodes to be implemented in data storage system 104. At 304, the process 300 may include parsing the configuration script to identify configuration data for the plurality of nodes, and At 306, each node in the plurality of nodes can be automatically installing based on the configuration data. As described above different types of nodes can be installed and configured sequentially. For example, a master proxy node can be installed and configured, followed by remaining proxy nodes, followed by storage nodes. Once the nodes have been installed according to the configuration data in the configuration script, at 308 a deployment instruction can be received to initialize each of the plurality of nodes. At 310, in response to the instruction, process 300 can include deploying the plurality of nodes in the cloud-based storage service. If an existing cluster is already deployed, the existing cluster can be updated using an updated configuration script. This is described further below with respect to FIG. 4.

FIG. 4 illustrates an example flow diagram showing a process 400 for automatically updating nodes in a data storage system, in accordance with one embodiment of the present invention. In some aspects, the process 400 of FIG. 4 may be performed by one or more proxy nodes of data storage system 104 shown in FIG. 1 and FIG. 2 respectively. The process 400 may begin at 402 by receiving a request, which includes an update configuration script, to reconfigure the plurality of nodes in the cloud-based storage service (e.g., a storage service provided by data storage system 104). At 404, the update configuration script can be parsed to identify updated configuration data for the plurality of nodes. At 406, the cloud-based storage service may be queried to determine current configuration data for the cloud-based storage service. By querying the current configuration data for the storage service, the system is not left to rely on prior configuration data which may be incorrect or incomplete, and does not require administrators to actively identify the particular new portions of the update configuration data. At 408, the update configuration data to the current configuration data. At 410, based on the comparison, the cloud-based storage service can be automatically updated according to the identified differences between the updated configuration data to the current configuration data. In some embodiments, the storage service can be automatically updated by storing the updated configuration data in an administrative node (e.g., master proxy node 212A) in the plurality of nodes. In some embodiments, the administrative node in the plurality of nodes automatically updates a plurality of proxy nodes associated with the administrative node. In some embodiments, the configuration data defines, for each node, a type of node, an address of the node, and disk space associated with the node.

Figure 5:
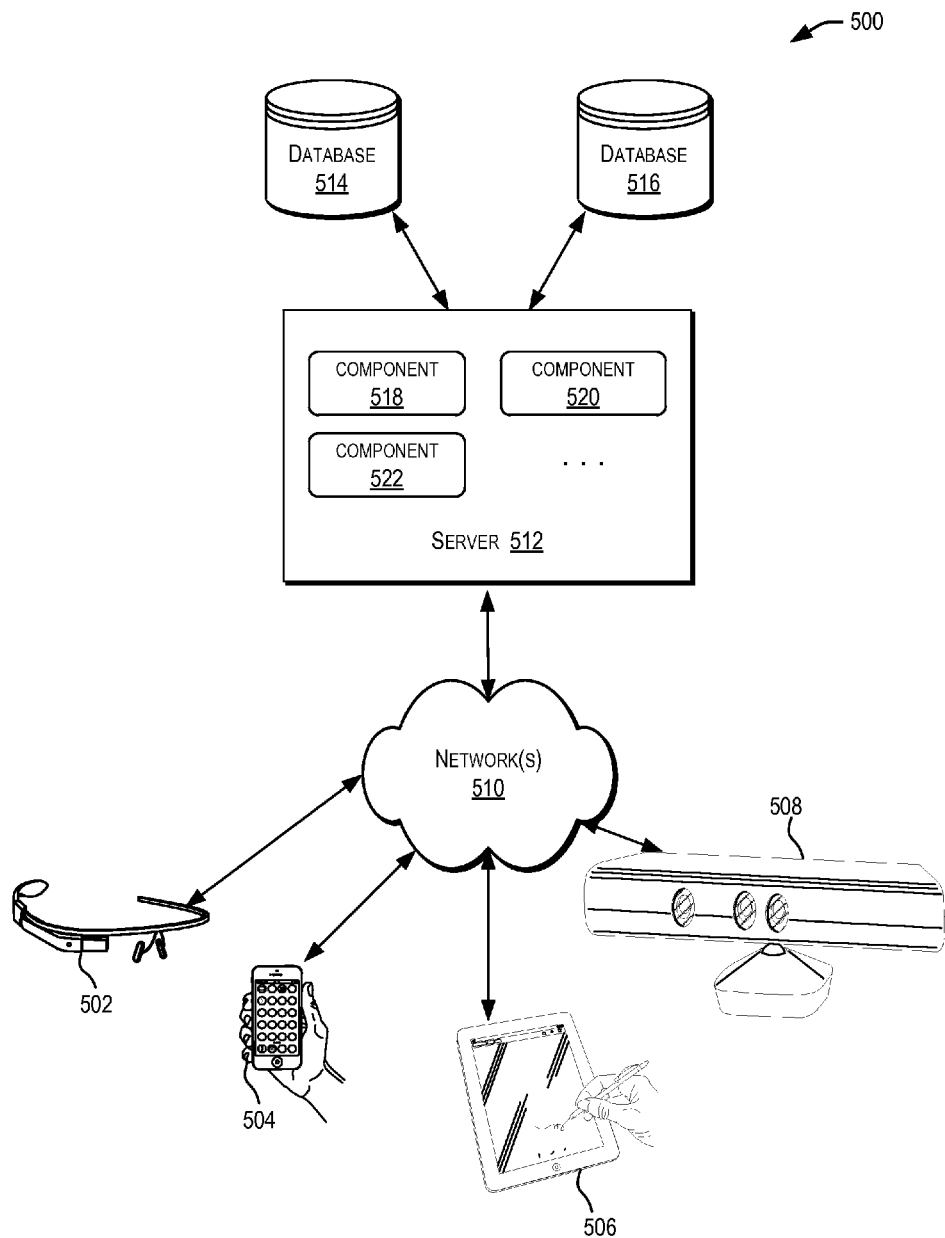
FIG. 5 depicts a simplified diagram of a distributed system for implementing an embodiment of the present invention.

FIG. 5 depicts a simplified diagram of a distributed system 500 for implementing an embodiment of the present disclosure. In the illustrated embodiment, the distributed system 500 includes one or more client computing devices 502, 504, 506, and 508, which are configured to execute and operate a client application such as a web browser, proprietary client (e.g., Oracle Forms), or the like over one or more network(s) 510. The server 512 may be communicatively coupled with the remote client computing devices 502, 504, 506, and 508 via network 510.

In various embodiments, the server 512 may be adapted to run one or more services or software applications such as services and applications that provide storage management services and identity management services. In certain embodiments, the server 512 may also provide other services or software applications can include non-virtual and virtual environments. In some embodiments, these services may be offered as web-based or cloud services or under a Software as a Service (SaaS) model to the users of the client computing devices 502, 504, 506, and/or 508. Users operating the client computing devices 502, 504, 506, and/or 508 may in turn utilize one or more client applications to interact with the server 512 to utilize the services provided by these components.

In the configuration depicted in FIG. 5, the software components 518, 520 and 522 of system 500 are shown as being implemented on the server 512. In other embodiments, one or more of the components of the system 500 and/or the services provided by these components may also be implemented by one or more of the client computing devices 502, 504, 506, and/or 508. Users operating the client computing devices may then utilize one or more client applications to use the services provided by these components. These components may be implemented in hardware, firmware, software, or combinations thereof. It should be appreciated that various different system configurations are possible, which may be different from distributed system 500. The embodiment shown in FIG. 10 is thus one example of a distributed system for implementing an embodiment system and is not intended to be limiting.

The client computing devices 502, 504, 506, and/or 508 may include various types of computing systems. For example, client device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over the network(s) 510.

Although distributed system 500 in FIG. 5 is shown with four client computing devices, any number of client computing devices may be supported. Other devices, such as devices with sensors, etc., may interact with the server 512.

The network(s) 510 in the distributed system 500 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, the network(s) 510 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

The server 512 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The server 512 can include one or more virtual machines running virtual operating systems, or other computing architectures involving virtualization. One or more flexible pools of logical storage devices can be virtualized to maintain virtual storage devices for the server. Virtual networks can be controlled by the server 512 using software defined networking. In various embodiments, the server 512 may be adapted to run one or more services or software applications described in the foregoing disclosure. For example, the server 512 may correspond to a server for performing processing as described above according to an embodiment of the present disclosure.

The server 512 may run an operating system including any of those discussed above, as well as any commercially available server operating system. Server 512 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, the server 512 may include one or more applications to analyze and consolidate data feeds and/or event updates received from users of the client computing devices 502, 504, 506, and 508. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. The server 512 may also include one or more applications to display the data feeds and/or real-time events via one or more display devices of the client computing devices 502, 504, 506, and 508.

The distributed system 500 may also include one or more databases 514 and 516. These databases may provide a mechanism for storing information such as user identity information, and other information used by embodiments of the present invention. Databases 514 and 516 may reside in a variety of locations. By way of example, one or more of databases 514 and 516 may reside on a non-transitory storage medium local to (and/or resident in) the server 512. Alternatively, the databases 514 and 516 may be remote from the server 512 and in communication with the server 512 via a network-based or dedicated connection. In one set of embodiments, the databases 514 and 516 may reside in a storage-area network (SAN). Similarly, any necessary files for performing the functions attributed to the server 512 may be stored locally on the server 512 and/or remotely, as appropriate. In one set of embodiments, the databases 514 and 516 may include relational databases, such as databases provided by Oracle, that are adapted to store, update, and retrieve data in response to SQL-formatted commands.

Figure 6:
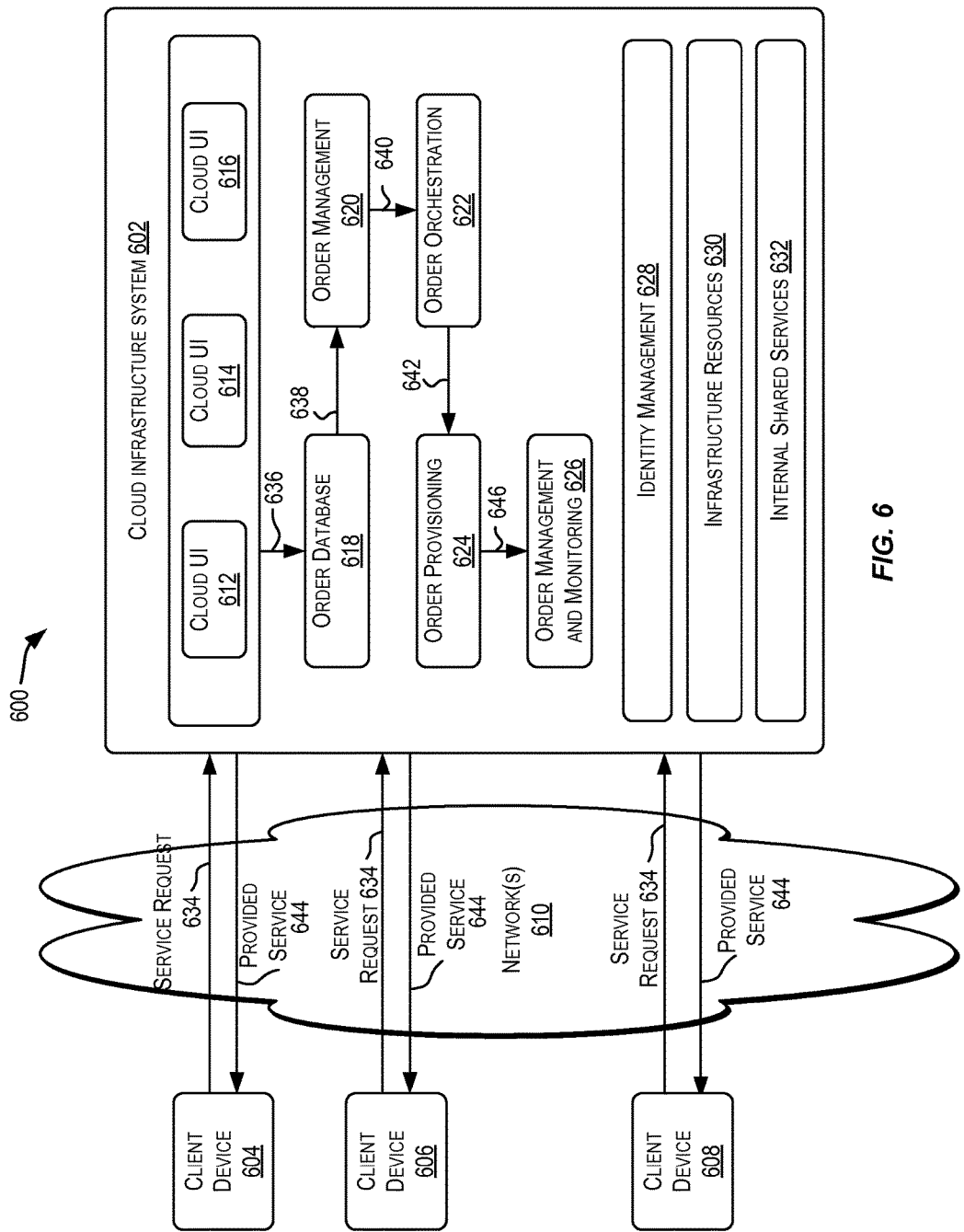
FIG. 6 is a simplified block diagram of one or more components of a system environment in which services may be offered as cloud services, in accordance with an embodiment of the present invention.

In some embodiments, the storage services and identity management services described above may be offered as services via a cloud environment. FIG. 6 is a simplified block diagram of one or more components of a system environment 600 in which services may be offered as cloud services, in accordance with an embodiment of the present disclosure. In the illustrated embodiment in FIG. 6, system environment 600 includes one or more client computing devices 604, 606, and 608 that may be used by users to interact with a cloud infrastructure system 602 that provides cloud services, including services for managing the storage of data stored in a data storage system of an organization. Cloud infrastructure system 602 may comprise one or more computers and/or servers that may include those described above for server 512.

It should be appreciated that cloud infrastructure system 602 depicted in FIG. 6 may have other components than those depicted. Further, the embodiment shown in FIG. 6 is only one example of a cloud infrastructure system that may incorporate an embodiment of the invention. In some other embodiments, cloud infrastructure system 602 may have more or fewer components than shown in the figure, may combine two or more components, or may have a different configuration or arrangement of components.

Client computing devices 604, 606, and 608 may be devices similar to those described above for 502, 504, 506, and 508. Client computing devices 604, 606, and 608 may be configured to operate a client application such as a web browser, a proprietary client application (e.g., Oracle® Forms), or some other application, which may be used by a user of the client computing device to interact with cloud infrastructure system 602 to use services provided by cloud infrastructure system 602. Although exemplary system environment 600 is shown with three client computing devices, any number of client computing devices may be supported. Other devices such as devices with sensors, etc. may interact with cloud infrastructure system 602.

Network(s) 610 may facilitate communications and exchange of data between clients 604, 606, and 608 and cloud infrastructure system 602. Each network may be any type of network familiar to those skilled in the art that can support data communications using any of a variety of commercially-available protocols, including those described above for network(s) 510.

In certain embodiments, services provided by cloud infrastructure system 602 may include a host of services that are made available to users of the cloud infrastructure system on demand. In addition to services related to identity management, various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 602 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 602 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 602 may also provide "big data" related computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 602 may be adapted to automatically provision, manage and track a customer's subscription to services offered by cloud infrastructure system 602. Cloud infrastructure system 602 may provide the cloud services via different deployment models. For example, services may be provided under a public cloud model in which cloud infrastructure system 602 is owned by an organization selling cloud services (e.g., owned by Oracle Corporation) and the services are made available to the general public or different industry enterprises. As another example, services may be provided under a private cloud model in which cloud infrastructure system 602 is operated solely for a single organization and may provide services for one or more entities within the organization. The cloud services may also be provided under a community cloud model in which cloud infrastructure system 602 and the services provided by cloud infrastructure system 602 are shared by several organizations in a related community. The cloud services may also be provided under a hybrid cloud model, which is a combination of two or more different models.

In some embodiments, the services provided by cloud infrastructure system 602 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 602. Cloud infrastructure system 602 then performs processing to provide the services in the customer's subscription order.

In some embodiments, the services provided by cloud infrastructure system 602 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 602 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 602 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 602 may also include infrastructure resources 630 for providing the resources used to provide various services to customers of the cloud infrastructure system. In one embodiment, infrastructure resources 630 may include pre-integrated and optimized combinations of hardware, such as servers, storage, and networking resources to execute the services provided by the PaaS platform and the SaaS platform, and other resources.

In some embodiments, resources in cloud infrastructure system 602 may be shared by multiple users and dynamically re-allocated per demand. Additionally, resources may be allocated to users in different time zones. For example, cloud infrastructure system 602 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 632 may be provided that are shared by different components or modules of cloud infrastructure system 602 to enable provision of services by cloud infrastructure system 602. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 602 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 602, and the like.

In one embodiment, as depicted in FIG. 6, cloud management functionality may be provided by one or more modules, such as an order management module 620, an order orchestration module 622, an order provisioning module 624, an order management and monitoring module 626, and an identity management module 628. These modules may include or be provided using one or more computers and/or servers, which may be general purpose computers, specialized server computers, server farms, server clusters, or any other appropriate arrangement and/or combination.

In an exemplary operation, at 634, a customer using a client device, such as client device 604, 606 or 608, may interact with cloud infrastructure system 602 by requesting one or more services provided by cloud infrastructure system 602 and placing an order for a subscription for one or more services offered by cloud infrastructure system 602. In certain embodiments, the customer may access a cloud User Interface (UI) such as cloud UI 612, cloud UI 614 and/or cloud UI 616 and place a subscription order via these UIs. The order information received by cloud infrastructure system 602 in response to the customer placing an order may include information identifying the customer and one or more services offered by the cloud infrastructure system 602 that the customer intends to subscribe to.

At 636, the order information received from the customer may be stored in an order database 618. If this is a new order, a new record may be created for the order. In one embodiment, order database 618 can be one of several databases operated by cloud infrastructure system 618 and operated in conjunction with other system elements.

At 638, the order information may be forwarded to an order management module 620 that may be configured to perform billing and accounting functions related to the order, such as verifying the order, and upon verification, booking the order.

At 640, information regarding the order may be communicated to an order orchestration module 622 that is configured to orchestrate the provisioning of services and resources for the order placed by the customer. In some instances, order orchestration module 622 may use the services of order provisioning module 624 for the provisioning. In certain embodiments, order orchestration module 622 enables the management of business processes associated with each order and applies business logic to determine whether an order should proceed to provisioning.

As shown in the embodiment depicted in FIG. 6, at 642, upon receiving an order for a new subscription, order orchestration module 622 sends a request to order provisioning module 624 to allocate resources and configure resources needed to fulfill the subscription order. Order provisioning module 624 enables the allocation of resources for the services ordered by the customer. Order provisioning module 624 provides a level of abstraction between the cloud services provided by cloud infrastructure system 600 and the physical implementation layer that is used to provision the resources for providing the requested services. This enables order orchestration module 624 to be isolated from implementation details, such as whether or not services and resources are actually provisioned on the fly or pre-provisioned and only allocated/assigned upon request.

At 644, once the services and resources are provisioned, a notification may be sent to the subscribing customers indicating that the requested service is now ready for use. In some instance, information (e.g. a link) may be sent to the customer that enables the customer to start using the requested services.

At 646, a customer's subscription order may be managed and tracked by an order management and monitoring module 626. In some instances, order management and monitoring module 626 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 600 may include an identity management module 628 that is configured to provide identity services, such as access management and authorization services in cloud infrastructure system 600. In some embodiments, identity management module 628 may control information about customers who wish to utilize the services provided by cloud infrastructure system 602. Such information can include information that authenticates the identities of such customers and information that describes which actions those customers are authorized to perform relative to various system resources (e.g., files, directories, applications, communication ports, memory segments, etc.) Identity management module 628 may also include the management of descriptive information about each customer and about how and by whom that descriptive information can be accessed and modified.

Figure 7:
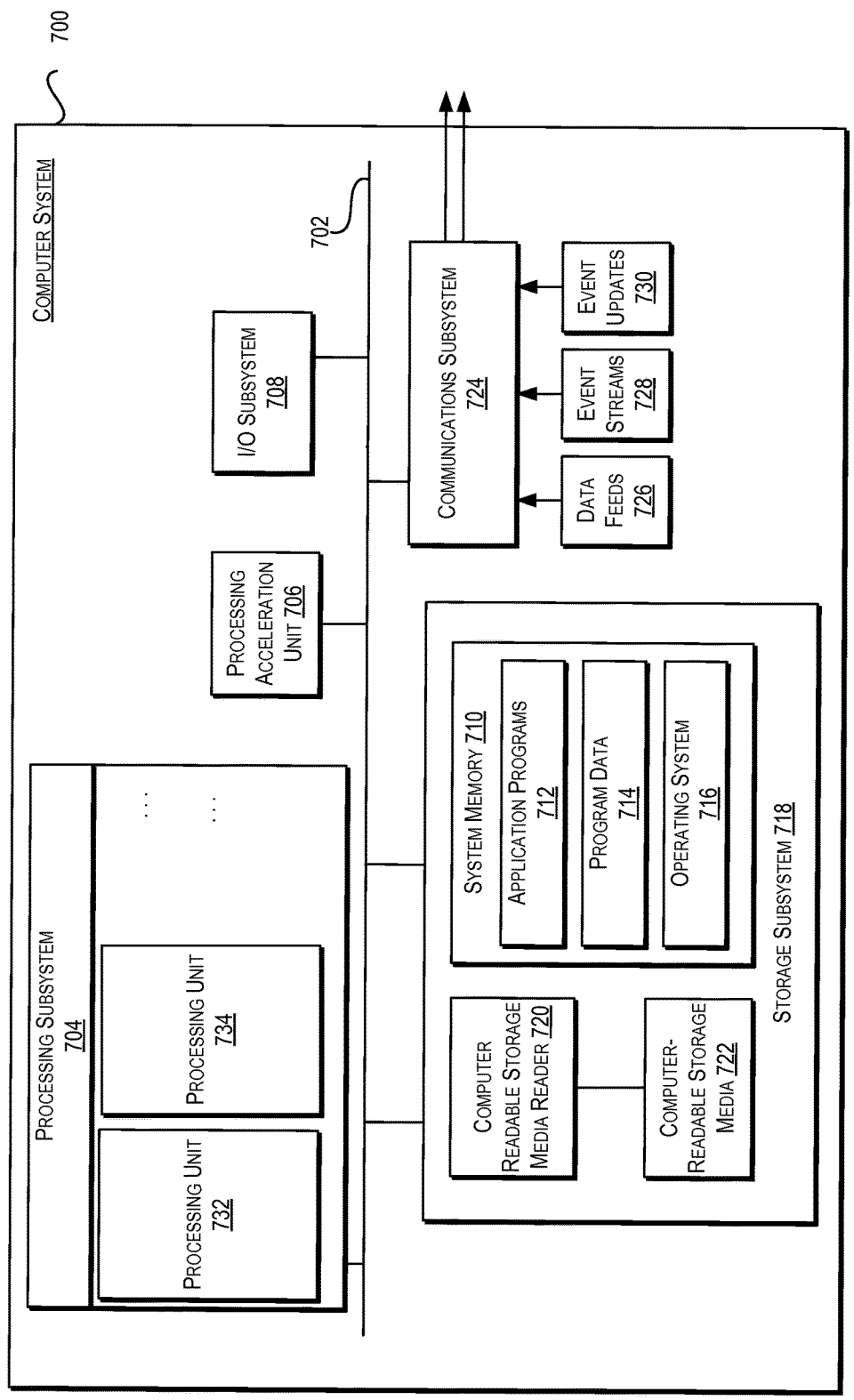
FIG. 7 illustrates an exemplary computer system that may be used to implement an embodiment of the present invention.

FIG. 7 illustrates an exemplary computer system 700 that may be used to implement an embodiment of the present invention. In some embodiments, computer system 700 may be used to implement any of the various servers and computer systems described above. As shown in FIG. 7, computer system 700 includes various subsystems including a processing subsystem 704 that communicates with a number of peripheral subsystems via a bus subsystem 702. These peripheral subsystems may include a processing acceleration unit 706, an I/O subsystem 708, a storage subsystem 718 and a communications subsystem 724. Storage subsystem 718 may include tangible computer-readable storage media 722 and a system memory 710.

Bus subsystem 702 provides a mechanism for letting the various components and subsystems of computer system 700 communicate with each other as intended. Although bus subsystem 702 is shown schematically as a single bus, alternative embodiments of the bus subsystem may utilize multiple buses. Bus subsystem 702 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 704 controls the operation of computer system 700 and may comprise one or more processing units 732, 734, etc. A processing unit may include be one or more processors, including single core or multicore processors, one or more cores of processors, or combinations thereof. In some embodiments, processing subsystem 704 can include one or more special purpose co-processors such as graphics processors, digital signal processors (DSPs), or the like. In some embodiments, some or all of the processing units of processing subsystem 704 can be implemented using customized circuits, such as application specific integrated circuits (ASICs), or field programmable gate arrays (FPGAs).

In some embodiments, the processing units in processing subsystem 704 can execute instructions stored in system memory 710 or on computer readable storage media 722. In various embodiments, the processing units can execute a variety of programs or code instructions and can maintain multiple concurrently executing programs or processes. At any given time, some or all of the program code to be executed can be resident in system memory 710 and/or on computer-readable storage media 710 including potentially on one or more storage devices. Through suitable programming, processing subsystem 704 can provide various functionalities described above for dynamically modifying documents (e.g., webpages) responsive to usage patterns.

In certain embodiments, a processing acceleration unit 706 may be provided for performing customized processing or for off-loading some of the processing performed by processing subsystem 704 so as to accelerate the overall processing performed by computer system 700.

I/O subsystem 708 may include devices and mechanisms for inputting information to computer system 700 and/or for outputting information from or via computer system 700. In general, use of the term "input device" is intended to include all possible types of devices and mechanisms for inputting information to computer system 700. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 700 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 718 provides a repository or data store for storing information that is used by computer system 700. Storage subsystem 718 provides a tangible non-transitory computer-readable storage medium for storing the basic programming and data constructs that provide the functionality of some embodiments. Software (programs, code modules, instructions) that when executed by processing subsystem 704 provide the functionality described above may be stored in storage subsystem 718. The software may be executed by one or more processing units of processing subsystem 704. Storage subsystem 718 may also provide a repository for storing data used in accordance with the present invention.

Storage subsystem 718 may include one or more non-transitory memory devices, including volatile and non-volatile memory devices. As shown in FIG. 7, storage subsystem 718 includes a system memory 710 and a computer-readable storage media 722. System memory 710 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 700, such as during start-up, may typically be stored in the ROM. The RAM typically contains data and/or program modules that are presently being operated and executed by processing subsystem 704. In some implementations, system memory 710 may include multiple different types of memory, such as static random access memory (SRAM) or dynamic random access memory (DRAM).

By way of example, and not limitation, as depicted in FIG. 7, system memory 710 may store application programs 712, which may include client applications, Web browsers, mid-tier applications, relational database management systems (RDBMS), etc., program data 714, and an operating system 716. By way of example, operating system 716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 722 may store programming and data constructs that provide the functionality of some embodiments. Software (programs, code modules, instructions) that when executed by processing subsystem 704 a processor provide the functionality described above may be stored in storage subsystem 718. By way of example, computer-readable storage media 722 may include non-volatile memory such as a hard disk drive, a magnetic disk drive, an optical disk drive such as a CD ROM, DVD, a Blu-Ray® disk, or other optical media. Computer-readable storage media 722 may include, but is not limited to, Zip® drives, flash memory cards, universal serial bus (USB) flash drives, secure digital (SD) cards, DVD disks, digital video tape, and the like. Computer-readable storage media 722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 722 may provide storage of computer-readable instructions, data structures, program modules, and other data for computer system 700.

In certain embodiments, storage subsystem 700 may also include a computer-readable storage media reader 720 that can further be connected to computer-readable storage media 722. Together and, optionally, in combination with system memory 710, computer-readable storage media 722 may comprehensively represent remote, local, fixed, and/or removable storage devices plus storage media for storing computer-readable information.

In certain embodiments, computer system 700 may provide support for executing one or more virtual machines. Computer system 700 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 700. Accordingly, multiple operating systems may potentially be run concurrently by computer system 700. Each virtual machine generally runs independently of the other virtual machines.

Communications subsystem 724 provides an interface to other computer systems and networks. Communications subsystem 724 serves as an interface for receiving data from and transmitting data to other systems from computer system 700. For example, communications subsystem 724 may enable computer system 700 to establish a communication channel to one or more client devices via the Internet for receiving and sending information from and to the client devices. For example, the account management system 112 depicted in FIG. 1 may receive user login information including input related to a training word from client devices using communication subsystem 724.

Communication subsystem 724 may support both wired and/or wireless communication protocols. For example, in certain embodiments, communications subsystem 724 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 724 can provide wired network connectivity (e.g., Ethernet) in addition to or instead of a wireless interface.

Communication subsystem 724 can receive and transmit data in various forms. For example, in some embodiments, communications subsystem 724 may receive input communication in the form of structured and/or unstructured data feeds 726, event streams 728, event updates 730, and the like. For example, communications subsystem 724 may be configured to receive (or send) data feeds 726 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 724 may be configured to receive data in the form of continuous data streams, which may include event streams 728 of real-time events and/or event updates 730, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 724 may also be configured to output the structured and/or unstructured data feeds 726, event streams 728, event updates 730, and the like to one or more databases that may be in communication with one or more streaming data source computers coupled to computer system 700.

Computer system 700 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 700 depicted in FIG. 7 is intended only as a specific example. Many other configurations having more or fewer components than the system depicted in FIG. 7 are possible. Based on the disclosure and teachings provided herein, a person of ordinary skill in the art will appreciate other ways and/or methods to implement the various embodiments.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps. Various features and aspects of the above-described embodiments may be used individually or jointly.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

What is claimed is:

1. A computer-implemented method comprising:
   receiving, from a computer of an administrative system, a configuration script at an installation framework executing in a cloud-based storage service provided by a storage system, wherein the configuration script defines a plurality of nodes to be deployed in the cloud-based storage service in the storage system, the plurality of nodes including a set of storage nodes configured to store data, a proxy node configured to handle one or more access requests for the data stored by the set of storage nodes, and a master proxy node configured to generate a mapping file that stores a mapping between data objects stored by the storage system and their physical locations on the set of storage nodes;
   parsing the configuration script to identify configuration data for the plurality of nodes, wherein the configuration data includes configuration information for configuring the set of storage nodes, configuration information for configuring the proxy node, and configuration information for configuring the master proxy node;
   installing the master proxy node based upon the configuration information for configuring the master proxy node, wherein the installing the master proxy node includes generating a token key and the mapping file;
   after installing the master proxy node, installing the proxy node based upon the configuration information for configuring the proxy node and propagating, by the master proxy, a copy of the mapping file to the proxy node for local storage of the copy of the mapping file at the proxy node such that the proxy node can identify the physical locations of the data objects on the set of storage nodes, wherein the configuration information includes the token key;
   after installing the proxy node, installing the set of storage nodes based upon the configuration information for configuring the set of storage nodes; and deploying the plurality of nodes in the storage system for providing the cloud-based storage service to a subscribing customer.

2. The computer-implemented method of claim 1, further comprising:
receiving a request to reconfigure the plurality of nodes in the storage system, wherein the request includes an update configuration script;
parsing the update configuration script to identify updated configuration data for the plurality of nodes;
querying the storage system to determine current configuration data for the cloud-based storage service;
comparing the updated configuration data to the current configuration data; and
automatically updating the cloud-based storage service based on a difference between the updated configuration data to the current configuration data.

3. The computer-implemented method of claim 2, wherein automatically updating further comprises storing the updated configuration data in the master proxy node.

4. The computer-implemented method of claim 3, wherein the master proxy node automatically updates and manages the installation of the proxy node.

5. The computer-implemented method of claim 1, wherein the configuration data defines, for each node of the plurality of nodes to be deployed for the cloud-based storage service, a type of the node, an address of the node, and a disk space associated with the node.

6. The computer-implemented method of claim 1, wherein each of the plurality of nodes is a physical node that is separate from other nodes in the plurality of nodes.

7. The computer-implemented method of claim 1, wherein the second node is installed based on determining that the second type of node for the second is not of the particular type of node.

8. The computer-implemented method of claim 1, further comprising:
receiving, at the proxy node, an access request to access a particular data object;
determining, by the proxy node using the mapping file, a particular location of the particular object on a particular storage node from the set of storage nodes; and
providing, by the proxy node, the particular data object stored as a response to the access request.

9. A system comprising:
a data storage system, including one or more computer clusters and an installation framework, that provides one or more cloud-based storage services; and
an administrative console of an administrative system, the administrative console including a user interface, wherein the administrative console is configured to send a configuration script to the data storage system, wherein the configuration script defines a plurality of nodes to be deployed for the cloud-based storage service in the data storage system, the plurality of nodes including a set of storage nodes configured to store data, a proxy node configured to handle one or more access requests for the data stored by the set of storage nodes, and a master proxy node configured to generate a mapping file that stores a mapping between data objects stored by the storage system and their physical locations on the set of storage nodes;
wherein when the configuration script is received by the data storage system from the administrative console, the installation framework is configured to:
parse the configuration script to identify configuration data for the plurality of nodes, wherein the configuration data includes configuration information for configuring the set of storage nodes, configuration information for configuring the proxy node, and configuration information for configuring the master proxy node;
installing the master proxy node based upon the configuration information for configuring the master proxy node, wherein the installing the master proxy node includes generating a token key and the mapping file;
after installing the master proxy node, installing the proxy node based upon the configuration information for configuring the proxy node and propagating, by the master proxy, a copy of the mapping file to the proxy node for local storage of the copy of the mapping file at the proxy node such that the proxy node can identify the physical locations of the data objects on the set of storage nodes, wherein the configuration information includes the token key;
after installing the proxy node, installing the set of storage nodes based upon the configuration information for configuring the set of storage nodes; and
deploy the plurality of nodes in the data storage system for providing the cloud-based storage service to a subscribing customer.

10. The system of claim 9, wherein:
the administrative console is further configured to send a request to reconfigure the plurality of nodes in the storage system, wherein the request includes an update configuration script; and
when the updated configuration script is received by the data storage system, the installation framework is configured to:
parse the update configuration script to identify updated configuration data for the plurality of nodes;
query the storage system to determine current configuration data for the cloud-based storage service;
compare the updated configuration data to the current configuration data; and
automatically update the cloud-based storage service based on a difference between the updated configuration data to the current configuration data.

11. The system of claim 10, wherein automatically updating the cloud-based storage service further comprises storing the updated configuration data in the master proxy node.

12. The system of claim 11, wherein the master proxy node automatically updates and manages the installation of the proxy node.

13. The system of claim 9, wherein the configuration data defines, for each node of the plurality of nodes to be deployed for the cloud-based storage service, a type of the node, an address of the node, and a disk space associated with the node.

14. The system of claim 9, wherein each of the plurality of nodes is a physical node that is separate from other nodes in the plurality of nodes.

15. One or more non-transitory computer-readable media storing computer-executable instructions executable by one or more processors, the computer-executable instructions comprising:
instructions that cause the one or more processors to receive, from a computer of an administrative system, a configuration script at an installation framework executing in a cloud-based storage service provided by a storage system, wherein the configuration script defines a plurality of nodes to be deployed for the cloud-based storage service in the storage system, the plurality of nodes including a set of storage nodes configured to store data, a proxy node configured to handle one or more access requests for the data stored by the set of storage nodes, and a master proxy node configured to generate a mapping file that stores a mapping between data objects stored by the storage system and their physical locations on the set of storage nodes;

instructions that cause the one or more processors to parse the configuration script to identify configuration data for the plurality of nodes, wherein the configuration data includes configuration information for configuring the set of storage nodes, configuration information for configuring the proxy node, and configuration information for configuring the master proxy node;

instructions that cause the one or more processors to install the master proxy node based upon the configuration information for configuring the master proxy node, wherein the installing the master proxy node includes generating a token key and the mapping file;

instructions that cause the one or more processors to, after installing the master proxy node, install the proxy node based upon the configuration information for configuring the proxy node and propagating, by the master proxy, a copy of the mapping file to the proxy node for local storage of the copy of the mapping file at the proxy node such that the proxy node can identify the physical locations of the data objects on the set of storage nodes, wherein the configuration information includes the token key;

instructions that cause the one or more processors to, after installing the proxy node, install the set of storage nodes based upon the configuration information for configuring the set of storage nodes; and instructions that cause the one or more processors to deploy the plurality of nodes in the storage system for providing the cloud-based storage service to a subscribing customer.

16. The non-transitory computer-readable media of claim 15, the computer-executable instructions further comprising:
instructions that cause the one or more processors to receive a request to reconfigure the plurality of nodes in the storage system, wherein the request includes an update configuration script;
instructions that cause the one or more processors to parse the update configuration script to identify updated configuration data for the plurality of nodes;
instructions that cause the one or more processors to query the data storage system to determine current configuration data for the cloud-based storage service;
instructions that cause the one or more processors to compare the updated configuration data to the current configuration data; and
instructions that cause the one or more processors to automatically update the cloud-based storage service based on a difference between the updated configuration data to the current configuration data.

17. The non-transitory computer-readable media of claim 16, wherein automatically updating the cloud-based storage service further comprises storing the updated configuration data in the master proxy node.

18. The non-transitory computer-readable media of claim 17, wherein the master proxy node automatically updates and manages the installation of the proxy node.

19. The non-transitory computer-readable media of claim 15, wherein the configuration data defines, for each node of the plurality of nodes to be deployed for the cloud-based storage service, a type of the node, an address of the node, and a disk space associated with the node.

* * * * *